No. 741,854. PATENTED OCT. 20, 1903.
W. W. & F. N. TREVOR.
MACHINE FOR REMOVING BARK FROM LOGS.
APPLICATION FILED FEB. 25, 1902.
NO MODEL. 2 SHEETS—SHEET 1.

Witnesses,
E. A. Volk.
F. F. Schurgulp

Inventors,
W. W. Trevor
F. N. Trevor
By Wilhelm Bonner
Attys

No. 741,854. PATENTED OCT. 20, 1903.
W. W. & F. N. TREVOR.
MACHINE FOR REMOVING BARK FROM LOGS.
APPLICATION FILED FEB. 25, 1902.
NO MODEL. 2 SHEETS—SHEET 2.
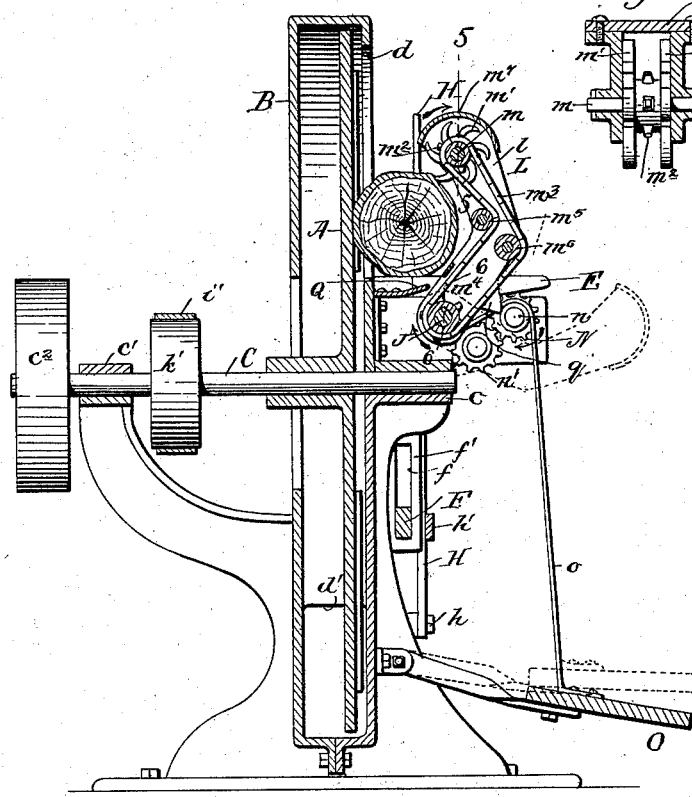
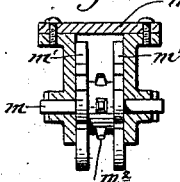
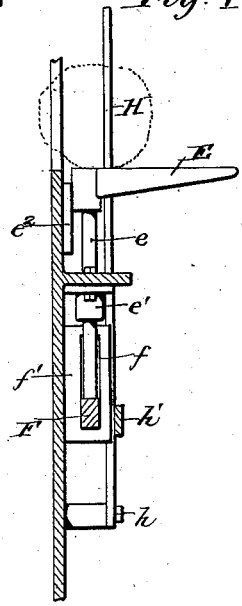
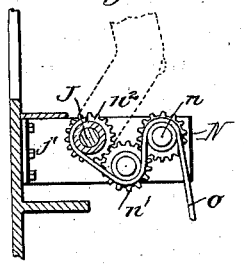
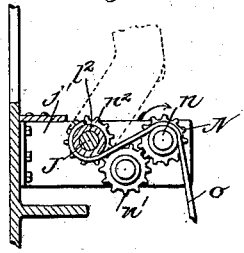
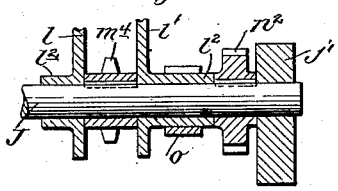

No. 741,854. Patented October 20, 1903.

UNITED STATES PATENT OFFICE.

WILLIAM W. TREVOR AND FRANCIS N. TREVOR, OF LOCKPORT, NEW YORK.

MACHINE FOR REMOVING BARK FROM LOGS.

SPECIFICATION forming part of Letters Patent No. 741,854, dated October 20, 1903.

Application filed February 25, 1902. Serial No. 95,580. (No model.)

*To all whom it may concern:*

Be it known that we, WILLIAM W. TREVOR and FRANCIS N. TREVOR, citizens of the United States, and residents of Lockport, in the county of Niagara and State of New York, have invented new and useful Improvements in Machines for Removing Bark from Logs, of which the following is a specification.

This invention relates to that class of machines for removing bark from logs intended for the manufacture of wood-pulp which comprises a vertical rotating cutter-disk arranged in a case, a support on the front side of the case on which the logs are placed and presented to the cutter through a suitable opening in the front of the case, and feed mechanism for pressing the logs toward the cutter and rotating them, so that all of the bark will be removed by the cutter.

One object of the invention is to provide such a machine with a simple mechanism whereby the log-support can be readily adjusted vertically to hold logs of different diameters in proper position relative to the cutter.

Another object of the invention is to provide an improved and simple feed mechanism for the logs.

Figure 1:
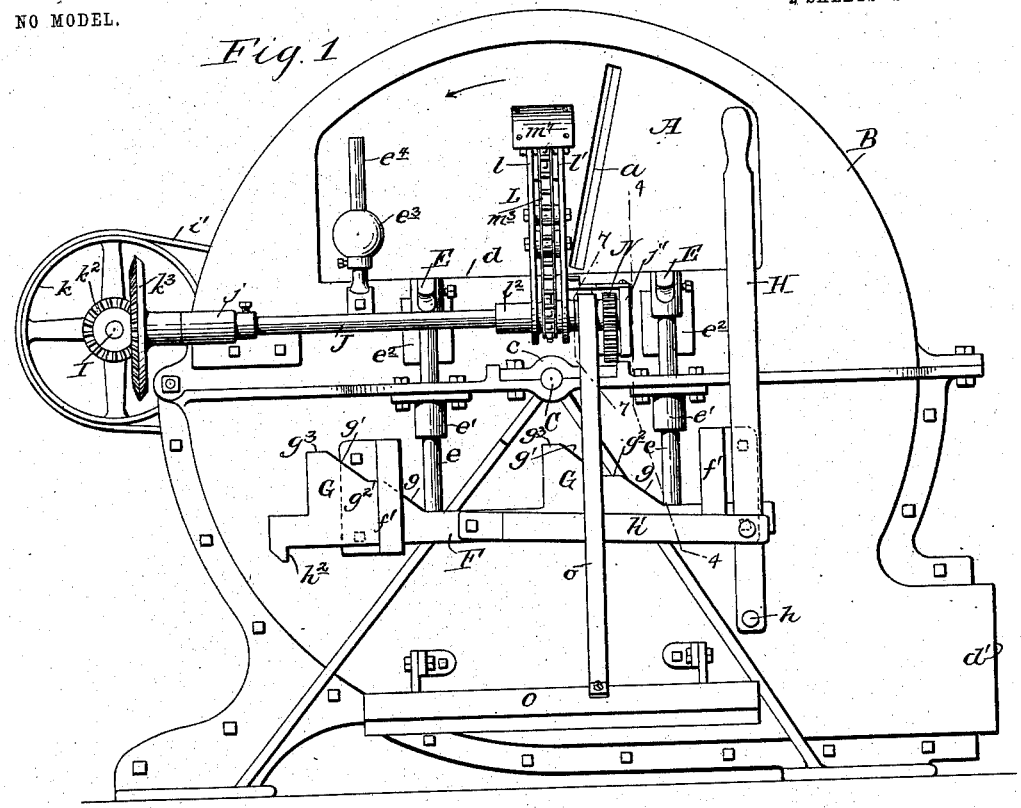
Figure 2:
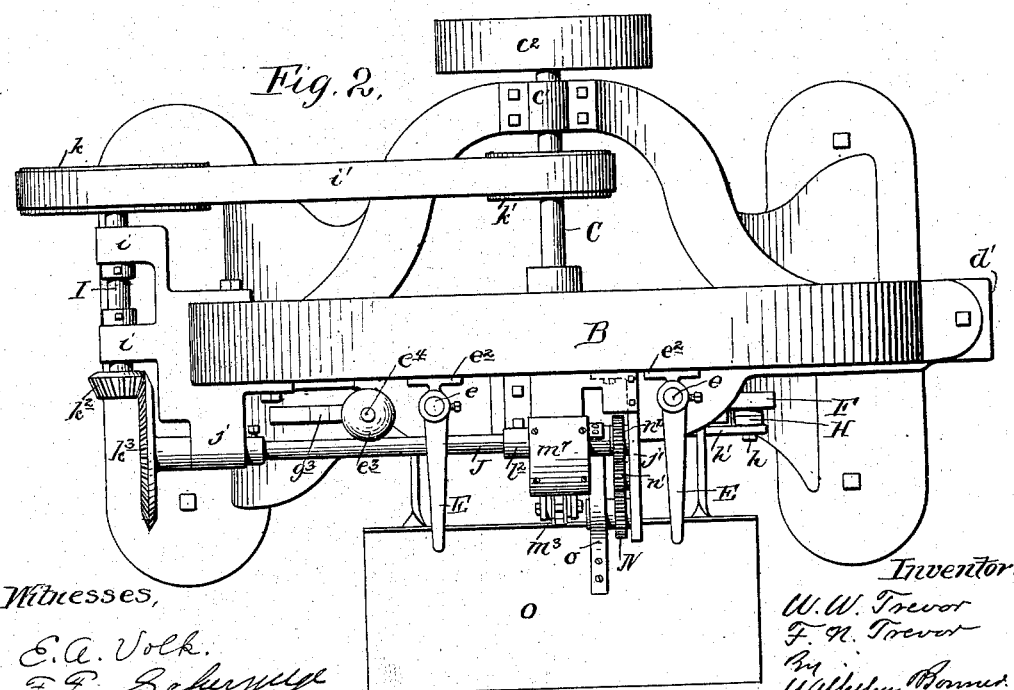

In the accompanying drawings, consisting of two sheets, Figure 1 is a front elevation of a machine embodying our invention. Fig. 2 is a plan view thereof. Fig. 3 is a transverse vertical sectional elevation. Fig. 4 is a fragmentary vertical sectional elevation on the line 4 4, Fig. 1. Fig. 5 is an enlarged sectional view of the upper part of the feed mechanism on the line 5 5, Fig. 3. Fig. 6 is an enlarged sectional view of the lower part of the feed mechanism on the line 6 6, Fig. 3. Fig. 7 is a sectional view on the line 7 7, Fig. 1, showing the strap of the feed mechanism and its rotary supports. Fig. 8 is a similar view showing a slightly-modified arrangement of the strap with reference to its rotary supports.

Like letters of reference refer to like parts in the several figures.

A represents the vertical cutter-disk, which, as usual, is provided on its front face with knives or cutters $a$, and B is the case inclosing the cutter-disk. The latter is mounted on a horizontal shaft C, which is journaled in bearings $c$ $c'$, arranged on the front and rear sides of the case. The shaft is provided in rear of the bearing $c'$ with a belt-pulley $c^2$, by which the shaft is driven in the direction of the arrow in Fig. 1.

The case is provided in the upper portion of its front side with the usual opening $d$, through which the logs are presented to the cutter-disk, and the lower portion of the case is provided with the usual outlet $d'$, through which the bark and shavings are discharged.

The support for the logs consists of two forwardly-projecting substantially horizontal arms E, arranged below the opening $d$, one on each side of the shaft C. Each arm is carried at the upper end of an upright rod or stem $e$, which is guided and vertically movable in a bearing $e'$, secured to the front side of the case B. Each supporting-arm is preferably provided at its rear end with a widened vertical portion $e^2$, having a flat rear face which rests against the vertical front face of the case for steadying the arm and preventing lateral and rotary movement thereof.

$e^3$ represents the usual end-thrust roller adjustably mounted and adapted to turn on a post $e^4$, arranged near one end of the feed-opening $d$.

It is desirable that logs of different diameters should be so supported that they will be presented to approximately the same portions of the cutters, and for this purpose the supporting-arms are provided with mechanism for raising and lowering the same and for holding the same in different positions. This mechanism, as shown in the drawings, is constructed as follows:

F represents a substantially horizontal rod or bar arranged across the face of the case beneath the lower ends of the upright stems $e$ of the supporting-arms and supported and movable horizontally in vertical slots or openings $f$, formed in brackets $f'$, secured to and projecting from the front side of the case. The bar F is provided with upwardly-projecting stepped wedges G, one for each supporting-arm. Each of these wedges is provided at one side with lower and upper inclined faces $g$ $g'$ and horizontal faces $g^2$ $g^3$ at the upper ends of the lower and upper inclined faces, respectively. In the normal position of the bar and wedges, as shown in the drawings, the lower ends of the stems $e$ of the supporting-arms rest on and are supported by the bar F just at the foot of the lower inclined faces $g$ of the wedges. If the bar F is moved to the right in Fig. 1, the lower inclined faces $g$ of the wedges will engage the lower ends of the stems $e$ and cause the latter to ride up on the inclined faces until the stems reach the horizontal faces $g^2$, which will support them. A further movement of the rod F in the same direction will cause the stems to ride up on the upper inclined faces $g'$ to the upper horizontal faces $g^3$. Upon moving the rod F in the opposite direction (to the left in Fig. 1) the stems will successively move off the horizontal faces and down the inclined faces by gravity. The supporting-arms can thus be quickly and easily raised or lowered and supported in either of three positions. The wedges may be provided with any desired number of inclined and horizontal faces to give any desired variety of adjustment. If but one log-support is employed, but one wedge is necessary for the vertical adjustment of the support.

Any suitable means may be employed for shifting the bar F horizontally. In the drawings a lever H is shown, which is pivoted at its lower end by a fulcrum-pin $h$ to the case and extends up to a position within easy reach of the operator. The lever is connected with the bar F by a link $h'$ or other suitable means.

$h^2$ indicates a stop shoulder or projection on one end of the bar F, adapted to engage the adjacent bracket $f'$ to limit the movement of the bar in one direction. The opposite movement of the bar is limited by the engagement of the lever H with the adjacent bracket $f'$.

The feed mechanism for pressing the logs toward the cutter-disk and rotating them is constructed as follows:

I represents a horizontal counter-shaft journaled parallel with the cutter-shaft C in bearings $i$ at one end of the case B, and J represents a horizontal feed-shaft arranged across the front of the case below the supporting-arms and journaled in bearings $j\ j'$. The shaft I is driven from the shaft C by a belt $i'$, running around a pulley $k$ on the rear end of the shaft I and a pulley $k'$ on the shaft C, and the shaft J is driven in the direction of the arrow, Fig. 3, from the counter-shaft I by means of a bevel-pinion $k^2$ and bevel-wheel $k^3$, respectively secured to said shafts I and J.

L represents an upright feed frame or arm arranged substantially centrally in front of the opening $d$ of the case and pivotally mounted at its lower end on the shaft J in such manner that its upper end is free to swing toward and from the case or cutter-disk. The frame or arm is preferably composed of two elbow-shaped side plates $l\ l'$, provided at their lower ends with hollow bearing bosses or sleeves $l^2$, through which the shaft J loosely passes. At the upper end of the frame a shaft $m$ is journaled in bearings in the side plates $l\ l'$, and on this shaft is secured a feed-wheel consisting of two wheels $m'$, having feeding spurs or prongs, and an intermediate sprocket-wheel $m^2$. The feed-wheel is driven so as to rotate upwardly on its inner or rear side, as indicated by the arrow in Fig. 3, by a sprocket-chain $m^3$, connecting the sprocket-wheel $m^2$ with a sprocket-wheel $m^4$, secured to the shaft J between the lower ends of the plates $l\ l'$ of the frame or arm. The sprocket-chain is caused to follow the bend of the arm by guide-rollers $m^5$ and $m^6$, arranged between the plates at the elbow or bend thereof.

$m^7$ represents a curved shield or guard plate, which is secured to the side plates of the arm and covers the upper and outer portions of the feed-wheel for preventing injury to the operator by accidental contact with the feed-wheel. The spurs or prongs of the feed-wheel project inwardly beyond the rear face of the feed frame or arm, so as to engage the upper outer portion of the log resting on the supporting-arms when the feed-frame is thrown rearward to the position shown in full lines in Fig. 3 and turn or rotate the log on the supporting-arms. The feed frame or arm being elbow-shaped enables a log of large diameter to be placed between the same and the cutter-disk and permits the feed-wheel to engage the log above the horizontal plane of its axis, and thus hold the same down on the log-support.

The feed frame or arm is moved rearward and held in operative position by the following means:

$n$ indicates a stud or arbor secured to the bearing $j'$ in front of and parallel with the transverse feed-shaft J. On this stud is loosely journaled a gear-pinion N, provided with an extended hub or sleeve. This pinion is driven, so as to rotate upwardly on its inner or rear side, as indicated by the arrow in Figs. 3 and 7, by means of an intermediate gear-pinion $n'$ from a pinion $n^2$, fixed on the feed-shaft J between the feed-arm and the bearing $j'$.

O represents a treadle having rearwardly-projecting arms pivoted to the lower front side of the case. The treadle is connected with the feed-frame by a strap $o$ or other flexible connection in such manner that by depressing the treadle the upper end of the feed-frame is swung rearwardly and the feed-wheel is engaged with the log, while upon releasing the treadle the forwardly-overhanging weight of the feed-arm causes the latter to be swung forwardly away from the log and the treadle to descend. The upper portion of the strap is passed rearwardly over the hub of the pinion N and thence under the adjacent bearing boss or sleeve $l^2$ on the feed-arm, to the rear side of which boss the upper end of the strap is secured. When the operator depresses the treadle, the strap $o$ is pulled down and the feed-arm swung rearwardly until the feed-wheel engages the log which has been placed on the log-support. The strap is held by the treadle in contact with the hub of the pinion N, and as the latter is driven in the direction in which the frictional contact between the hub and the strap tends to draw the strap forward the action of the rotary hub tends to swing the feed frame or arm rearward, thus greatly assisting the operator and requiring him to exert but slight pressure on the treadle in order to press the log against the cutter-disk and rotate it.

In the arrangement of the strap shown in Fig. 8 the treadle-strap passes between its engagement with the hub of the pinion N and its connection with the feed-frame down under the extended hub or sleeve of the intermediate pinion $n'$. This arrangement gives the strap frictional contact with the hubs of both pinions N and $n'$, whereby a greater pull is exerted on the strap than by the arrangement shown in the other figures.

Q represents a stop secured to a stationary part of the machine and arranged between the case and the feed frame or arm for stopping the rearward movement of the feed-arm and preventing the same from being accidentally thrown back against the cutter when there is no log on the supporting-arms.

$q$ represents a stop shoulder or projection on the lower portion of the front side of the feed frame or arm, which is adapted to engage the front bearing $c$ to limit the forward or downward movement of the arm, which is adapted to fall by gravity when the treadle is released.

The operation of the machine is substantially as follows: When the treadle is not depressed by the operator, the overhanging weight of the feed frame or arm causes the same to rest in the forwardly-projecting position. (Indicated in dotted lines in Fig. 3.) The log from which the bark is to be removed is now placed on the supporting-arms in the rear of the feed-frame. Then by shifting the lever H the supporting-arms are adjusted vertically to properly position the log relative to the cutter, as before explained. The feed frame or arm is then thrown rearward by depressing the treadle to cause the feed-wheel to engage the log. The rotation of the feed-wheel rotates the log, and the latter is held to the cutter with the desired pressure, which is governed by the pressure applied to the treadle by the operator. When all the bark has been removed from the log, the treadle is released, which permits the feed frame or arm to fall away from the log to the initial position. (Shown in dotted lines in Fig. 3.)

We claim as our invention—

1. In a machine for removing bark from logs, the combination of a vertical cutter, a vertically-adjustable log-support, a horizontally-movable bar provided with stepped horizontal faces connected by inclined faces, and a lever connected to said bar for moving the same horizontally, whereby said inclined faces engage said log-support and lift the same from one horizontal face to the next, said horizontal faces acting to hold said log-support stationary at different elevations, substantially as set forth.

2. In a machine for removing bark from logs, the combination of a vertical cutter, a support for holding the log adjacent to said cutter, an elbow-shaped feed-frame pivoted at its inner end below said log-support, a spur feed-wheel carried by the outer end of said feed-frame, means for rotating said feed-wheel, and means for moving said feed-frame to cause the feed-wheel to engage the log on the upper portion thereof and press the log against said cutter and rotate the log on said log-support, substantially as set forth.

3. In a machine for removing bark from logs, the combination of a vertical cutter, a support for holding the log adjacent to said cutter, an elbow-shaped feed-frame pivoted at its inner end below said log-support, a spur feed-wheel carried by the outer end of said feed-frame, means for rotating said feed-wheel, a shield for said feed-wheel carried by said frame, and means for moving said feed-frame to cause the feed-wheel to engage the log on the upper portion thereof and press the log against said cutter and rotate the log on said log-support, substantially as set forth.

4. The combination with a rotary cutter-disk and a log-support, of a feed-frame movable toward and from said cutter-disk, a feed device carried by said frame, a strap connected to said frame for moving the same toward the cutter-disk, a rotary part with which said strap frictionally engages, and which tends to move the feed-frame toward the cutter-disk, and means for driving said rotary part, substantially as set forth.

5. The combination with a rotary cutter-disk, and a log-support, of a feed-frame pivoted at its lower end to swing at its upper end toward and from said cutter-disk, a feed device carried by the upper end of said frame, a treadle, a strap connecting said treadle to said feed-frame, and a positively-rotated part between said feed-frame and said treadle over which said strap passes, and which tends to draw said strap in the direction in which it causes the feed-frame to swing toward the cutter, substantially as set forth.

6. The combination with a rotary cutter-disk and a log-support, of a feed-frame pivoted at its lower end to swing with its upper end toward and from the cutter-disk, a bearing-sleeve secured to the lower end of the feed-frame, a driving gear-wheel, a gear-wheel having an extended hub and mounted in front of said bearing-sleeve and driving gear-wheel, an intermediate gear-wheel connecting said gear-wheels, a treadle, and a strap connecting the treadle with the bearing-sleeve of the feed-frame and passing around said extended hub, substantially as set forth.

7. The combination with a rotary cutter-disk, and a log-support, of a feed-shaft arranged across said disk, a feed-frame pivoted at its lower end in line with said shaft, a feed-wheel arranged at the upper end of the feed-frame, driving mechanism connecting said feed-wheel with said shaft, a pinion provided with an extended hub and arranged in front of the lower portion of said feed-frame, means for driving said pinion from said feed-shaft, a treadle, and a strap connecting said treadle with the pivoted lower portion of said feed-frame and passing over said extended hub, substantially as set forth.

8. The combination with a rotary cutter-disk, and a log-support, of a transverse feed-shaft arranged in front of said cutter-disk, an elbow-shaped feed-frame pivoted on said feed-shaft, a pronged feed-wheel mounted in the upper end of said feed-frame so as to bear on the upper part of a log on said support and provided with a sprocket-wheel, a sprocket-wheel secured to said feed-shaft adjacent to the lower end of the feed-frame, and a drive-chain connecting said sprocket-wheels, substantially as set forth.

9. The combination with a rotary cutter-disk, and a log-support, of a transverse feed-shaft arranged in front of the cutter-disk, an elbow-shaped feed-frame pivoted at its lower end on said feed-shaft, a pronged feed-wheel mounted in the upper end of said feed-frame and provided with a sprocket-wheel, a sprocket-wheel secured to the feed-shaft adjacent to the lower end of the feed-frame, a drive-chain connecting said sprocket-wheels, and guide-rollers for the drive-chain mounted on the feed-frame at the elbow bend thereof, substantially as set forth.

Witness our hands this 18th day of February, 1902.

WILLIAM W. TREVOR.
FRANCIS N. TREVOR.

Witnesses:
M. L. WEBSTER,
H. F. CUSHMAN.